US005426261A

United States Patent [19]

Toda

[11] Patent Number: 5,426,261

[45] Date of Patent: Jun. 20, 1995

[54] MUSICAL TONE CONTROL WAVEFORM SIGNAL GENERATING APPARATUS UTILIZING WAVEFORM DATA PARAMETERS IN TIME-DIVISION INTERVALS

[75] Inventor: Hiroyuki Toda, Hamamatsu, Japan

[73] Assignee: Yamaha Corporation, Hamamatsu, Japan

[21] Appl. No.: 943,129

[22] Filed: Sep. 10, 1992

Related U.S. Application Data

[63] Continuation of Ser. No. 593,250, Oct. 5, 1990, abandoned.

[30] Foreign Application Priority Data

Oct. 6, 1989 [JP] Japan ................................ 1-262320
Oct. 6, 1989 [JP] Japan ................................ 1-262321

[51] Int. Cl.[6] ................................ G01H 7/00
[52] U.S. Cl. ................................ 84/607; 84/627
[58] Field of Search ................ 84/604, 607, 626, 627, 84/663

[56] References Cited

U.S. PATENT DOCUMENTS 4,528,885 7/1985 Chihana ................ 84/626
4,573,389 3/1986 Suzuki et al. ................ 84/627
4,738,179 4/1988 Hideo ................ 84/604
4,748,888 6/1988 Oya ................ 84/604
4,893,539 1/1990 Nishimoto ................ 84/663
5,109,746 5/1992 Takauji et al. ................ 84/607
5,173,567 12/1992 Fujita ................ 84/607
5,264,657 11/1993 Takauji ................ 84/607

*Primary Examiner*—William M. Shoop, Jr.
*Assistant Examiner*—Jeffrey W. Donels
*Attorney, Agent, or Firm*—Spensley Horn Jubas & Lubitz

[57] ABSTRACT

A musical tone control waveform signal generating apparatus is provided in order to generate a musical tone control waveform signal by which a musical tone generated from an electronic musical instrument is to be controlled. The musical tone control waveform signal is varied in its envelop level by each of time-division sections to be passed over a lapse of time. For instance, when a key-depression event is occurred, this musical tone control waveform signal of each time-division section is formed by carrying out a computation by use of parameters which are preset with respect to each section. Preferably, the parameters concern with the variation rate and target level of the musical tone control waveform signal to be formed by each section.

11 Claims, 13 Drawing Sheets

EG LEVEL TABLE

53d

| m | n | ONL 0 | ONL 1 | ONL 2 | ONL 3 | ONL 4 | LOOP | OFL 1 | OFL 2 |
|---|---|---|---|---|---|---|---|---|---|
| 0 | 0 | | | | | | | | |
| | 1 | | | | | | | | |
| 1 | 0 | | | | | | | | |
| | 1 | | | | | | | | |
| • | • | | | | | | | | |
| • | • | | | | | | | | |
| • | • | | | | | | | | |
| • | • | | | | | | | | |
| • | • | | | | | | | | |

FIG.3C

EG RATE TABLE

53e

| m | n | DT | ONR 1 | ONR 2 | ONR 3 | ONR 4 | OFR 1 | OFR 2 |
|---|---|---|---|---|---|---|---|---|
| 0 | 0 | | | | | | | |
| | 1 | | | | | | | |
| 1 | 0 | | | | | | | |
| | 1 | | | | | | | |
| • | • | | | | | | | |
| • | • | | | | | | | |
| • | • | | | | | | | |
| • | • | | | | | | | |
| • | • | | | | | | | |

FIG.3D

MUSICAL TONE CONTROL WAVEFORM SIGNAL GENERATING APPARATUS UTILIZING WAVEFORM DATA PARAMETERS IN TIME-DIVISION INTERVALS

This is a continuation of application Ser. No. 07/593,250 filed on Oct. 5, 1990, now abandoned.

BACKGROUND OF THE INVENTION

1. Field of the Invention

The present invention relates to a musical tone control waveform signal generating apparatus which, is synchronized with a start timing when a musical tone is generated, generates a musical tone control waveform signal to be varied over a lapse of time.

2. Prior Art

As disclosed in Japanese Patent Laid-Open Publication No. 61-39097, the conventional apparatus forms a waveform signal which is rapidly raised up from the reference level (e.g., zero level) in synchronism with the start timing of generation of the musical tone, then smoothly attenuated to and maintained at a predetermined level for a while, and thereafter attenuated down. By use of such waveform signals, the conventional apparatus controls an amplitude envelope of the musical tone and another amplitude envelope of the modulation signal by which the musical tone is to be formed.

If the above-mentioned waveform signal is attenuated to and maintained at the predetermined level for a long time, or if the waveform signal is raised up and then maintained at the predetermined level for a long time, the musical parameter to be controlled by the waveform signal should be fixed for a long time, which makes the musical tone to be monotonous.

In addition, the conventional apparatus can merely form a waveform signal which is rapidly raised up from the reference level but cannot form the musical tone signal having various kinds of characteristics.

SUMMARY OF THE INVENTION

It is accordingly a primary object of the present invention to provide a musical tone control waveform signal generating apparatus capable of forming the musical tone control waveform signal full of variety which can be varied over a lapse of time.

It is another object of the present invention to provide an apparatus for generating a musical tone control waveform signal of which characteristics can be varied.

In a first aspect of the present invention, there is provided a musical tone control waveform signal generating apparatus comprising:

parameter storing means for storing parameters which are used to form a musical tone control waveform signal with respect to each of plural time-division sections to be passed over a lapse of time;

musical tone control waveform signal forming means for forming the musical tone control waveform signal with respect to each of plural time-division sections based on the parameters to be sequentially read from the parameter storing means; and control means for controlling the musical tone control waveform signal forming means such that the musical tone control waveform signal of a predetermined section within plural time-division sections is repeatedly formed based on the parameters corresponding to the predetermined section.

In a second aspect of the present invention, there is provided a musical tone control waveform signal generating apparatus comprising:

parameter storing means for storing parameters which define a musical tone control waveform signal;

computation means for carrying out a computation based on the parameters;

musical tone control waveform signal forming means for forming a musical tone control waveform signal under operation of the computation means by use of the parameters, wherein an envelope level of the musical tone control waveform signal is varied over a lapse of time;

initial level setting means for setting an initial level of the musical tone control waveform signal at a predetermined level;

initial period setting means for setting an initial period in which the musical tone control waveform signal is at the predetermined level set by the initial level setting means; and control means for controlling the musical tone control waveform signal forming means such that the musical tone control waveform signal is maintained at the predetermined level during the initial period set by the initial period setting means.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings:

FIGS. 3A to 3D are drawings each showing a data format of table data stored in a working memory shown in FIG. 1;

DESCRIPTION OF A PREFERRED EMBODIMENT

Figure 1:
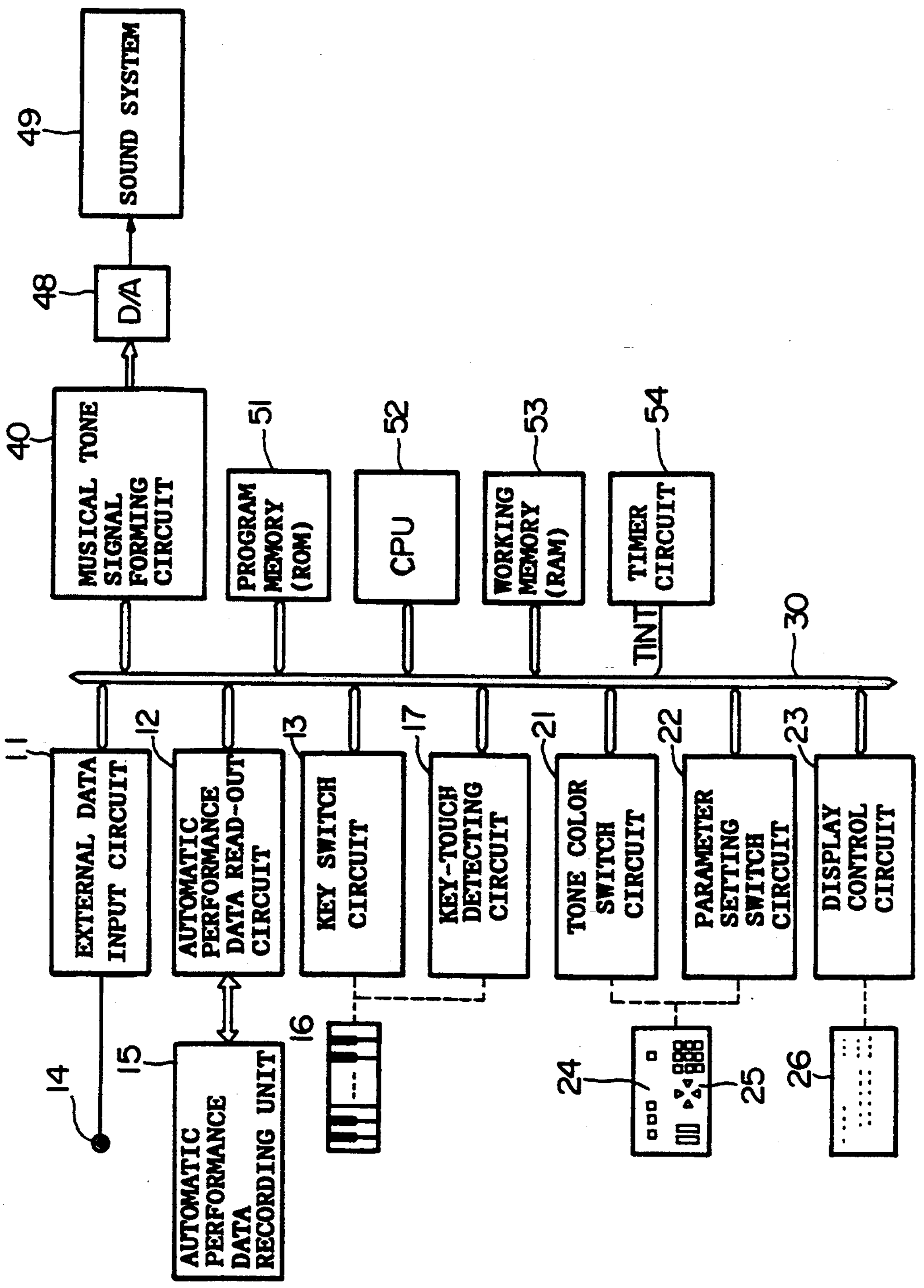
FIG. 1 is a block diagram showing a whole configuration of an electronic musical instrument providing with a musical tone control waveform signal generating apparatus according to a present invention.

Next, description will be given with respect to an embodiment of the present invention by referring to the drawings.

A. Configuration of Embodiment

FIG. 1 is a block diagram showing the whole configuration of the electronic musical instrument employing the musical tone control waveform signal generating apparatus according to an embodiment of the present invention.

In FIG. 1, this electronic musical instrument provides an external data input circuit 11 for inputting a performance signal by which generation of the musical tone is controlled, an automatic performance data read-out circuit 12 and a key switch circuit 13. The external data input circuit 11 is coupled to an external connection terminal 14 to which an external device (not shown) such as other instruments supplies the performance signal such as a key-depression state signal and a key-touch signal. The automatic performance data read-out circuit 12 is coupled to an automatic performance data recording unit 15 which includes the recording medium such as the floppy disk, magnetic tape and read-only memory (ROM). From this automatic performance data recording unit 15, the automatic performance data read-out circuit 12 reads an automatic performance signal corresponding to the foregoing performance signal. The key switch circuit 13 contains plural key switches each corresponding to each of the keys of a keyboard 16, wherein each key switch is designed to output the key-depression state signal representative of the key-depression state of each key. In addition, a key-touch detecting circuit 17 is connected in parallel to the key switch circuit 13, wherein it detects the key-touch of each key to be depressed to thereby output a key-touch detecting signal.

Moreover, this electronic musical instrument provides a tone color switch circuit 21, a parameter setting switch circuit 22 and a display control circuit 23. The tone color switch circuit 21 contains plural switching circuits each corresponding to each of plural tone color selecting switches 24. Herein, the tone color selecting switches 24 are arranged on a panel face, wherein they are provided to designate the predetermined tone color numbers respectively. For example, each tone color number corresponds to "piano 1", "piano 2" and the like. Each of the switching circuits in the tone color switch circuit 21 outputs an operating state signal representative of an operating state of each tone color selecting switch. Similarly, the parameter setting switch circuit 22 contains plural switching circuits each corresponding to each of plural parameter setting switches 25 which are arranged on the panel face. Herein, the parameter setting switches 25 are provided to control the musical tone having the tone color designated by the tone color selecting switch, and each of the switching circuits in the parameter setting switch circuit 22 outputs an operating state signal representative of an operating state of each parameter setting switch. The display control circuit 23 is provided to control the displaying state of a display unit 26 equipped at the panel face. These circuits 11 to 13, 17, 21 to 23 described above are all connected to a bus 30.

Figure 2:
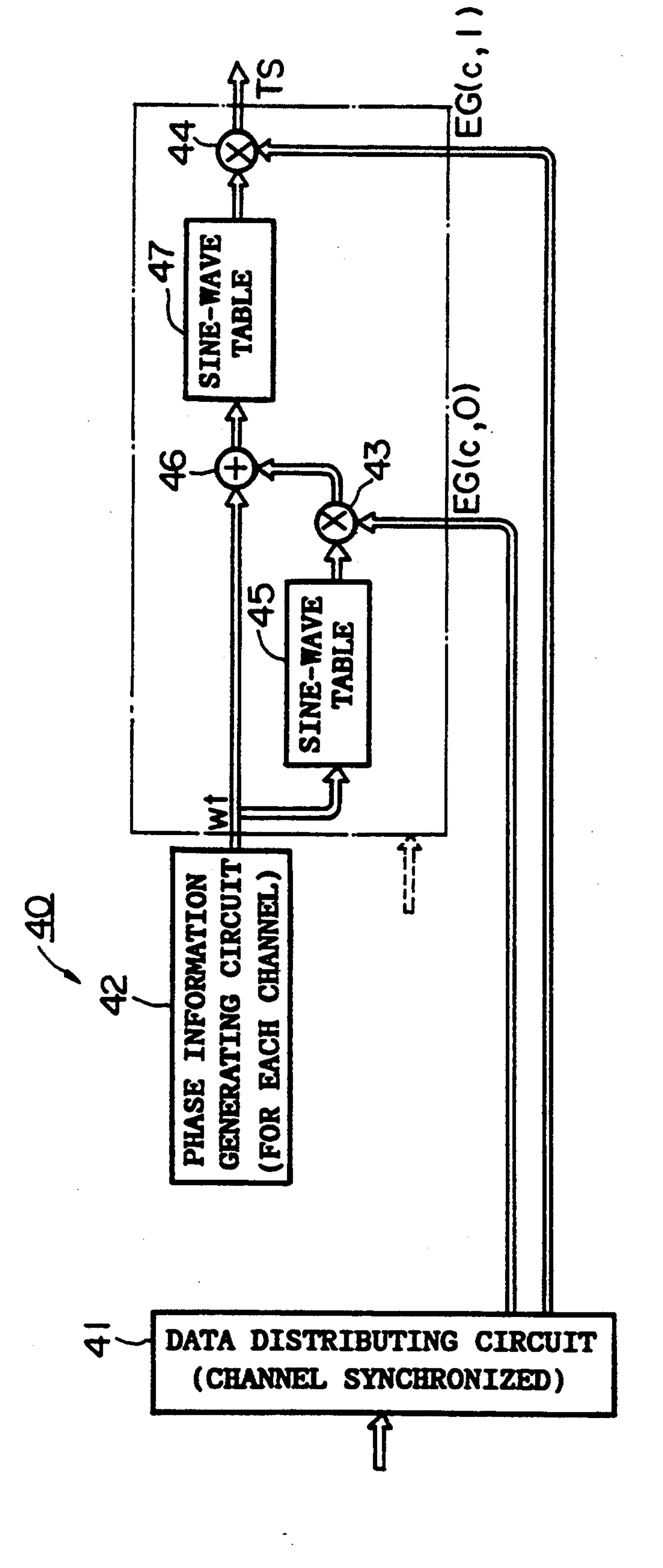
FIG. 2 is a block diagram showing a detailed configuration of a musical tone signal forming circuit shown in FIG. 1.
Figure 3A:
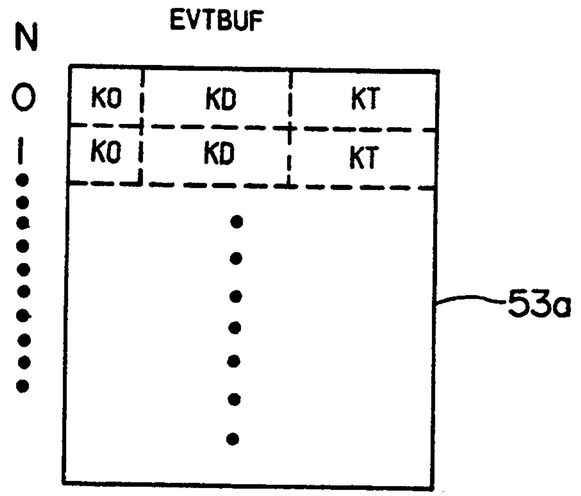
Figure 3B:
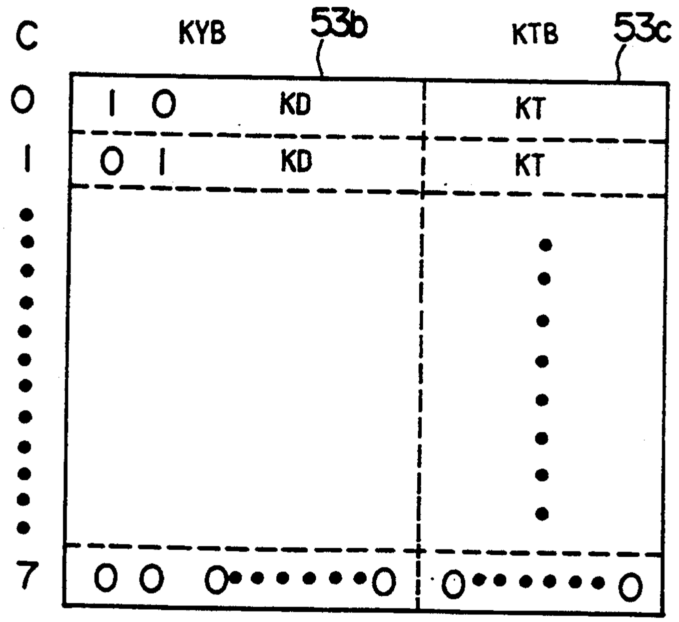

Further, the bus is connected with a musical tone signal forming circuit 40 which forms and outputs the musical tone signal. This musical tone signal forming circuit 40 can form plural musical tone signals (i.e., eight musical tone signals in the present embodiment) in different channels respectively in response to data supplied thereto via the bus 30. For example, this circuit 40 is configured as shown in FIG. 2, wherein the musical tone signal is synthesized by effecting the frequency modulation (FM) operation. In FIG. 2, this musical tone signal forming circuit 40 contains a data distributing circuit 41 which receives channel data, frequency data and envelope data via the bus 30. In synchronism with musical tone channeling timings, the data distributing circuit 41 distributes the channel data, frequency data and envelope data EG(c,0), EG(c,1) to a phase information generating circuit 42 and multipliers 43, 44 respectively. In synchronism with the musical tone channeling timing, the phase information generating circuit 42 accumulates the frequency data to thereby form phase information ωt representative of the phase of the waveform signal. Then, the phase information generating circuit 42 sequentially outputs the phase information ωt to a sine-wave table 45 and an adder 46 respectively in synchronism with the musical tone channeling timing. Based on the phase information ωt, the sine-wave data is read from the sine-wave table 45, and then the read sine-wave data is supplied to the multiplier 43. The multiplier 43 multiplies the sine-wave data by the foregoing envelope data EG(c,0), and the product is supplied to the adder 46. The adder 46 adds the multiplication result of multiplier 43 to the phase information ωt, so that the addition result thereof is supplied to another sine-wave table 47. Based on the addition result of adder 46, the sine-wave data is read from the sine-wave table 47, and then the read sine-wave data is supplied to the multiplier 44. The multiplier 44 multiplies the sine-wave data read from the sine-wave table 47 by the foregoing envelope data EG(c,1). Thus, the multiplier 44 outputs the multiplication result:

$$\text{"}EG(c,1)*sin[\omega t+EG(c,0)*sin\ \omega t]\text{"}$$

Then, the digital musical tone signal (i.e., digital waveform signal) outputted from the musical tone signal forming circuit 40 is converted into the analog signal by a digital-to-analog (D/A) converter 48. Such analog signal is supplied to a sound system 49 which contains an amplifier, a speaker (not shown) and the like. The sound system 49 converts the analog signal into the acoustic signal, and then the sounds corresponding to the acoustic signal are to be sounded.

In order to assign the depressed key to the tone-generation channel, from the envelope data EG(c,0), EG(c,1) and control generation of the musical tone, there is further provided a program memory 51, a central processing unit (CPU) 52, a working memory 53 and a timer circuit 54 all of which are coupled to the bus 30. These elements S1 to 54 form a micro-computer. Herein, the program memory 51 is constructed by the read-only memory (ROM) which stores necessary constant data and programs as shown by the flowcharts in FIGS. 5 to 10. The CPU 52 is designed to execute the "main program" shown in FIG. 5 every time the power switch (not shown) is turned on. Every time the timer circuit 54 generates a timer interrupt signal TINT, the CPU 52 executes the "timer interrupt program" shown in FIG. 8 as the interruption.

The working memory 53 is constructed by the random-access memory (RAM), wherein it contains an event buffer area 53a, a keyboard buffer area 53b, a key-touch buffer area 53c, an envelope level table 53d, an envelope rate table area 53e and other memory areas as shown in FIGS. 3A to 3D. In response to the key-depression state signal from the external data input circuit 11, automatic performance data read-out circuit 12 and key switch circuit 13, the event buffer area 53a stores a key-depression state signal KO, key data KD and key-touch data KT with respect to all of the depressed keys. When playing the keyboard performance, the key-touch data KT is given from the key-touch detecting circuit 17. Herein, the key-depression state signal KO at "1" level indicates the state where the key is depressed, while KO at "0" level indicates the state where the key is released. In addition, the key data KD indicates the key name of the keyboard 16. The keyboard buffer area 53b provides eight memory channels each corresponding to each of eight channels of the musical tone signal forming circuit 40. Herein, upper two bits (i.e., leftmost two bits) of the data stored in each channel of the area 53b indicate generation-state data of the musical tone signal with respect to the key assigned to each channel, while other lower bits indicate the key data KD. The first bit of the above-mentioned generation-state data (i.e., MSB of the data stored in each channel of the area 53b) at "1" level indicates the key-depression state, the first bit at "0" level indicates the key-release state. On the other hand, the second bit of the generation-state data at "1" level indicates the decay state where the musical tone is decayed after the key-release event. When the second bit is at "0" level, it is indicated that the above-mentioned decay state is completed. In response to the key data KD, the key-touch buffer area 53c stores the key-touch data KT indicating the key touch concerning the key to be assigned to each channel.

Figure 4A:
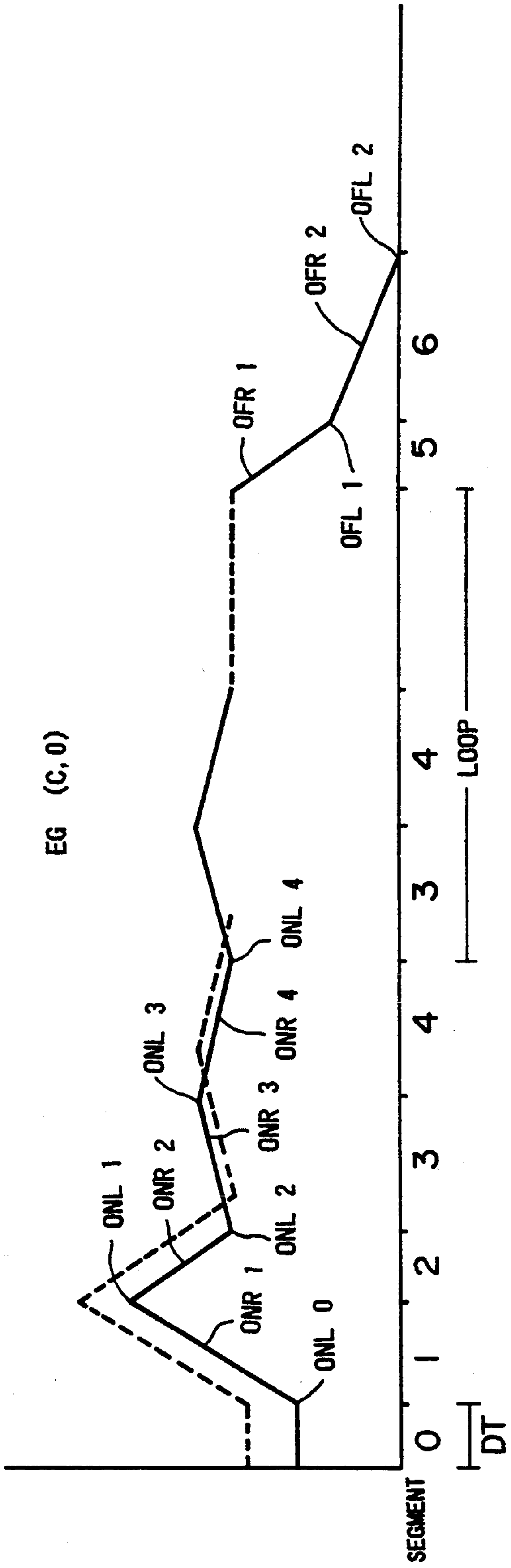
FIGS. 4A and 4B are graphs each showing an example of the envelope waveform.
Figure 4B:
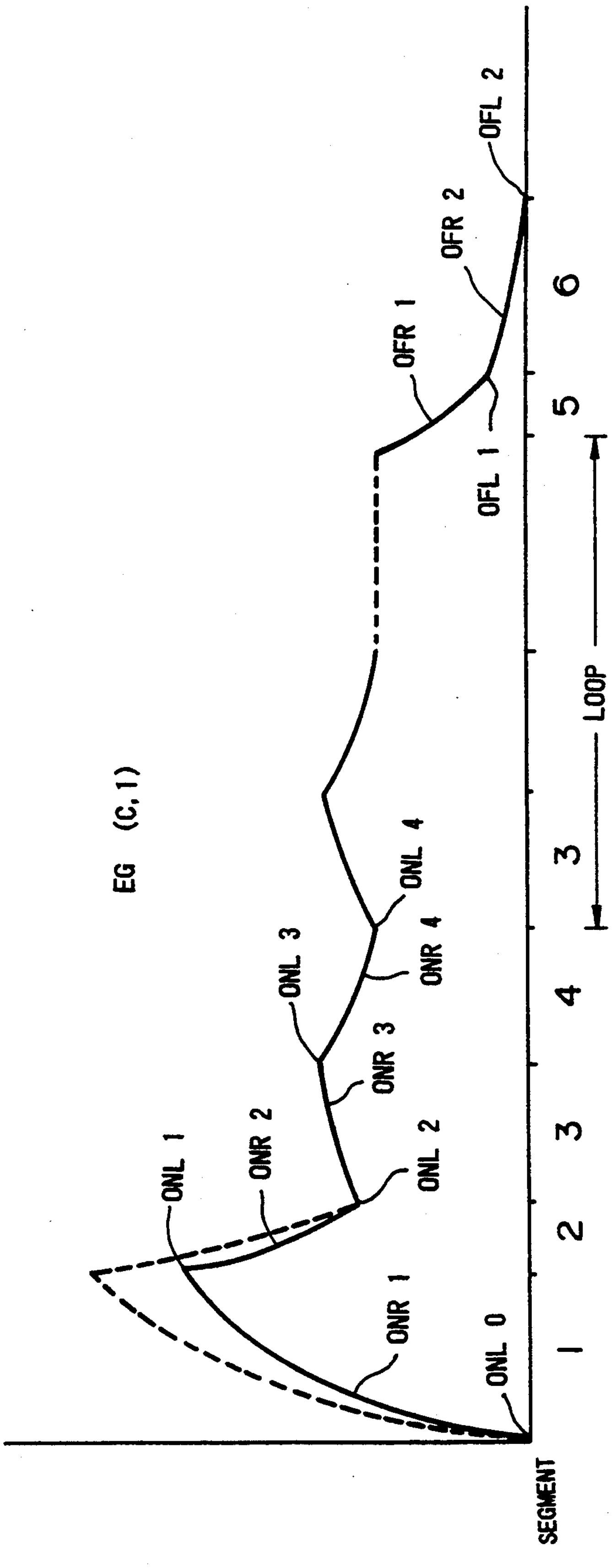

In response to m tone color numbers, the storage area of the envelope level table 53d is divided into m sections each further divided into two small sections (corresponding to n=0, 1 respectively). Herein, each of two small sections stores No. 0 to No. 4 on-levels ONL0 to ONL4, loop number LOOP, No. 1 and No. 2 off-levels OFL1, OFL2. As shown in FIGS. 4A, 4B, the envelope waveform rises up or falls down in each of time-division sections, so that the peak value or critical value is occurred in its amplitude in each time-division section. Therefore, each of No. 0 to No. 4 on-levels ONL0 to ONL4, No. 1 and No. 2 off-levels OFL1, OFL2 indicates such peak or critical value in each of the time-division sections. Herein, No. 0 to No. 4 on-levels ONL0 to ONL4 correspond to the key-depression state, while No. 1 and No. 2 off-levels correspond to the key-release state. The loop number LOOP indicates the start timing at which the waveform signal is repeatedly generated. As similar to the foregoing level table area 53d, the storage area of the envelope rate table area 53e is divided into m sections each further divided into two small sections (corresponding to n=0, 1 respectively). Each of two small sections stores a delay time DT, No. 1 to No. 4 on-rates ONR1 to ONR4, No. 1 and No. 2 off-rates OFR1, OFR2. As shown in FIG. 4A, the envelope waveform amplitude is initially maintained at No. 0 on-level ONL0 during the delay time DT when the musical tone is started to be generated. As shown in FIGS. 4A, 4B, each of No. 1 to No. 4 on-rates ONR1, ONR4, No. 1 and No. 2 off-rates OFR1, OFR2 indicates the variation rate of the envelope waveform amplitude which rises up or falls down in each time-division section. Herein, No. 1 to No. 4 on-rates ONR1 to ONR4 correspond to the key-depression state, while No. 1 and No. 2 off-rates correspond to the key-release state.

Incidentally, the timer circuit 54 contains an oscillator, by which the timer interrupt signal TINT is repeatedly outputted.

B. Operation of Embodiment

Next, description will be given with respect to the operation of the present embodiment.

First, diagrammatical description will be given with respect to the whole operation of the present embodiment as follows.

(1) Whole Operation

Figure 5:
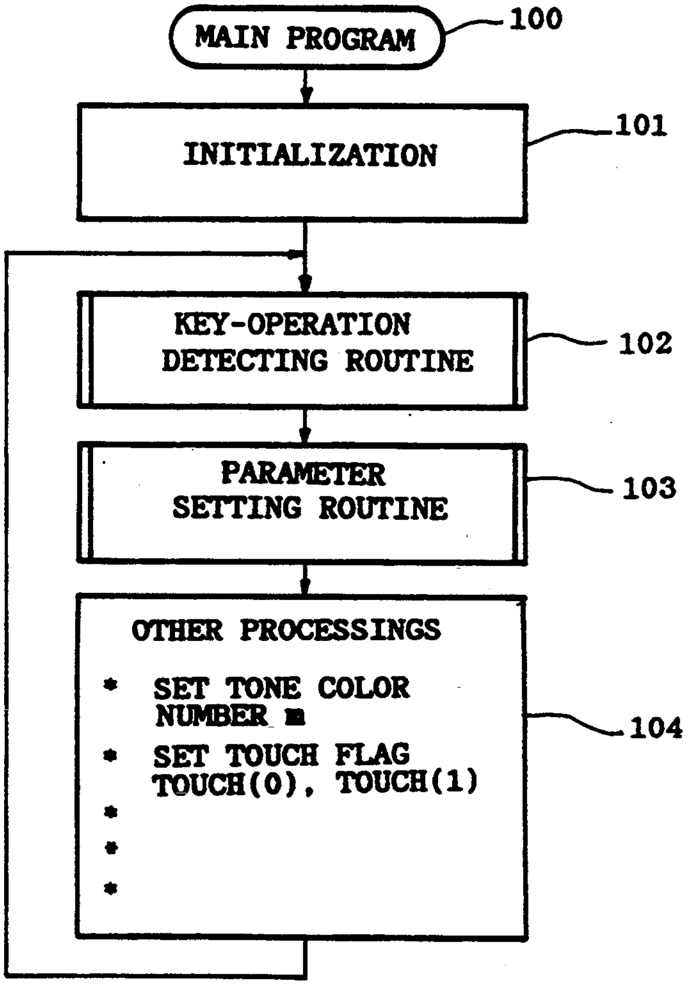
FIGS. 5 to 10 are flowcharts showing processings of programs stored in a program memory shown in FIG. 1.

When the power switch is on, the CPU 52 starts to execute the "main program" in step 100 shown in FIG. 5. step 101, the initialization is carried out such that the CPU 52 clears and then writes the necessary data into the predetermined portion of the working memory 53. In this case, the event buffer area 53a, keyboard buffer area 53b and key-touch buffer area 53c are cleared, while the standard parameters are written into the envelope level table area 53d and envelope rate table area 53e.

Figure 6:
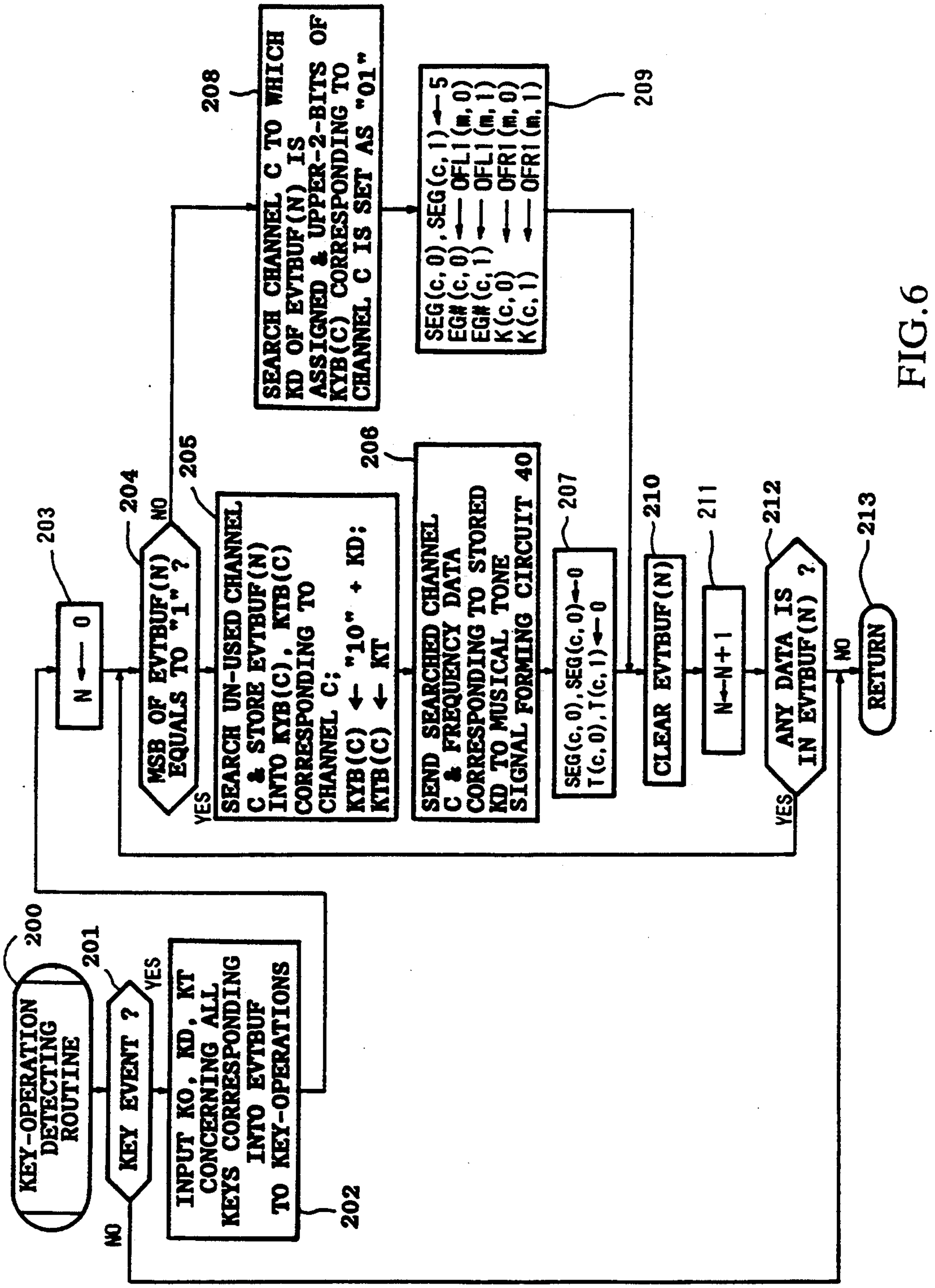
Figure 8:
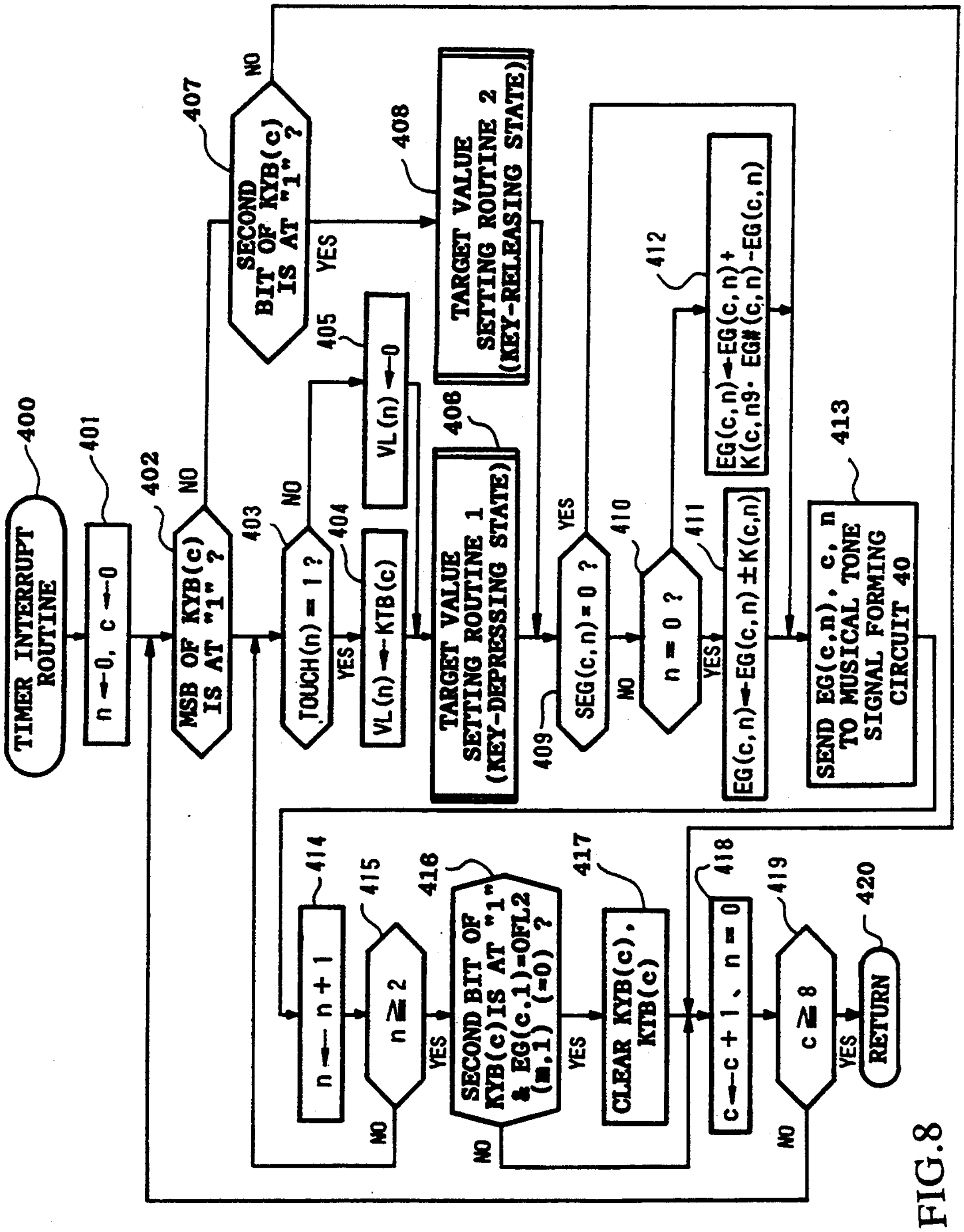

Thereafter, the CPU 52 executes the circulating processes consisting of processes of steps 102 to 104. In step 102, processes of "key-operation detecting routine" as shown in FIG. 6 are executed so that in response to the keydepression state signal from the external data input circuit 11, automatic performance data read-out circuit 12 and key switch circuit 13, generation of the musical tone signal is controlled to be started or terminated in the musical tone signal forming circuit 40. Due to the execution of the "key-operation detecting routine", the data concerning the frequency of the musical tone signal is supplied to the musical tone signal forming circuit 40. Therefore, the frequency of the musical tone signal formed in the musical tone signal forming circuit 40 is to be controlled by such data. On the other hand, the envelope data EG(c,0), EG(c,1) indicating the envelope waveforms as shown in FIGS. 4A, 4B are used to control the amplitudes of the modulation signal and musical tone signal, and they are supplied to the musical tone signal forming circuit 40 by executing the "timer interrupt program" as shown in FIG. 8. In the foregoing "key-operation detecting routine", only the initial control to be made at the key-operation timing is carried out on the above-mentioned envelope data EG(c,0), EG(c,1).

In step 103, processes of "parameter setting routine" are executed. Herein, in response to the operation detecting signal from the parameter setting switch circuit 22 corresponding to the parameter setting switches 25, several kinds of the parameters are set or changed in the envelope level table area 53d and envelope rate table area 53e. These parameters determine the envelope waveform.

In step 104, other processes are to be executed. Herein, the CPU 52 executes the processes concerning the operations of the switches and controls other than the above-mentioned switches etc. Particularly, step 104 sets the tone color number m and touch flags TOUCH(O), TOUCH(l) to be used for forming the envelope data EG(c,0), EG(c,1) in response to the operation of any one of the tone color selecting switches 24.

Next, detailed description will be given with respect to "parameter setting/changing operation" to be carried out in response to the operations of the parameter setting switches 25 and "musical tone signal forming operation" including the operation of forming the envelope waveform, to be carried out in response to the key-operation.

(2) Parameter Setting/Changing Operation

Figure 7:
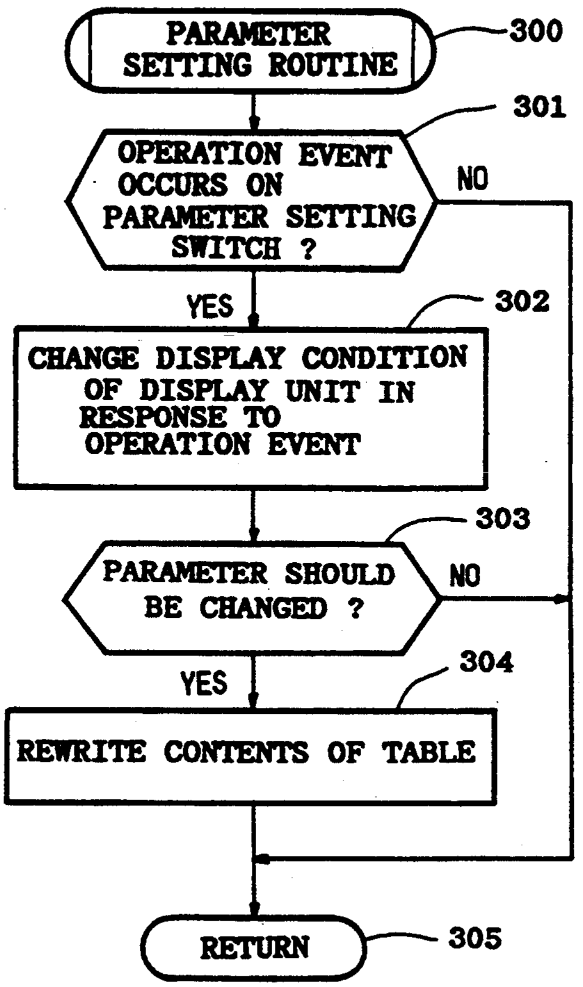

The parameter setting routine is carried out in step 103 of the "main program" and the execution thereof is started in step 300 shown in FIG. 7. In next step 301, it is judged whether or not any one of the parameter setting switches 25 is operated. If none of them is operated, the judgement result of step 301 is "NO" so that the processing directly proceeds to step 305 wherein execution of the parameter setting routine is terminated.

On the other hand, if any one of the parameter setting switches 25 is operated, the judgement result of step 301 is "YES" so that the processing proceeds to step 302 wherein the corresponding display control signal is outputted to the display control circuit 23. Thus, the display control circuit 23 controls the display unit 26 such that its display state is changed in response to the operation of the parameter setting switch 25. At the same time, if the operation of the parameter setting switch 25 concerns the change of the parameter, judgement result of next step 303 turns to "YES" so that the processing proceeds to step 304 wherein the corresponding parameters are renewed in the envelope level table area 53d and envelope rate table area 53e in response to the operation of the parameter setting switch 25.

Next, the above-mentioned operation is described with respect to the concrete example. In the case where the menu state is selected by the initialization or the operation of certain switch, the display unit 26 displays the menu image (see FIG. 11A) in which the desirable parameters to be changed can be selected. In this case, by moving the cursor on the display screen by use of certain switch, it is possible to select the desirable parameters to be changed. When the parameters concerning the envelope level are selected, several kinds of the parameters ONL0 to ONL4, OFL1, OFL2 concerning the tone color number m are read from the envelope level table area 53d and then supplied to the display control circuit 23, so that the display unit 26 displays those parameters and tone color number m (see FIG. 11B). On the other hand, when the parameters concerning the envelope rate are selected, several kinds of the parameters DT, ONR1 to ONR4, OFR1, OFR2 concerning the tone color number m are read from the envelope rate table area 53e and then supplied to the display control circuit 23, so that the display unit 26 displays those parameters and tone color number m (see FIG. 11C). In this case, the tone color number m is still maintained at the value which is previously set.

Figure 11A:
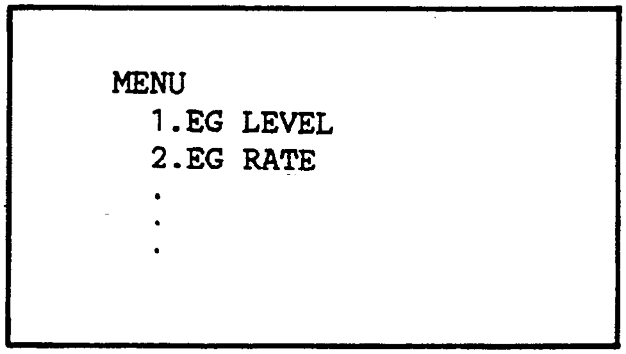
FIGS. 11A to 11C are drawings each showing an example of a display image to be displayed in a display unit shown in FIG. 1.
Figure 11B:
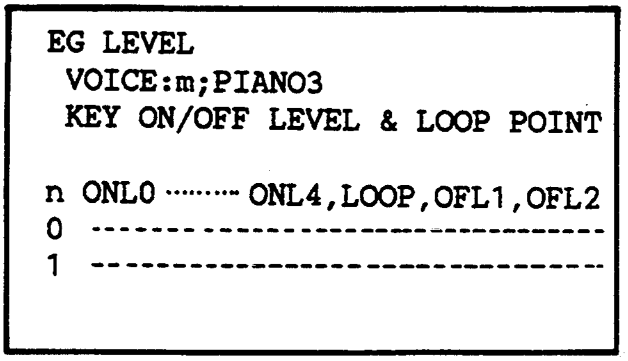
Figure 11C:
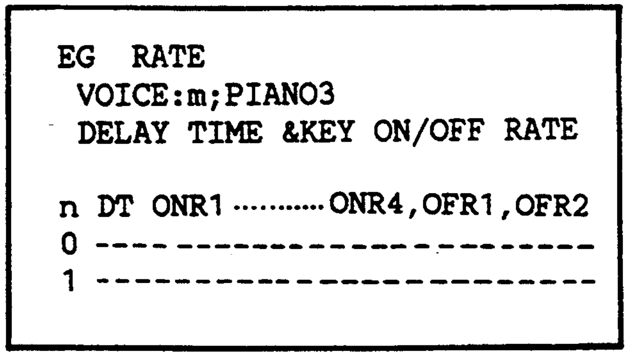

By operating the certain switch, the cursor is moved to the desirable position so that the parameter value designated by the cursor is to be changed. As a result, the changed parameters are newly written at the predetermined positions of the tables 53d, 53e. When changing the tone color number m in the display screen as shown in FIGS. 11B, 11C, the parameters displayed by the display unit 26 are changed. Even in this case, it is possible to return the display image as shown in FIGS. 11B, 11C to the menu image as shown in FIG. 11A by operating the predetermined switch.

As described heretofore, it is possible to desirably set the parameters ONL0 to ONL4, LOOP, OFL1, OFL2 in the envelope level table area 53d and the parameters DT, ONR1 to ONR4, OFR1, OFR2 in the envelope rate table area 53e.

(3) Musical Tone Signal Forming Operation

The key-operation detecting routine is carried out in step 102 of the main program, and the execution thereof is started in step 200 shown in FIG. 6. In step 201, it is judged whether or not the key event is occurred. This judgement is made in order to detect the change of the key-depression state by comparing the current and preceding key-depression state signals which are supplied from the external data input circuit 11, automatic performance data read-out circuit 12 and key switch circuit 13. If there is no change between the current and preceding key-depression state signals, the judgement result of step 201 turns to "NO" so that the processing directly proceeds to step 213 wherein execution of the key-operation detecting routine is terminated. On the other hand, if there is a change between the current and preceding key-depression state signals (indicating that new key-depression or key-release event is occurred), the judgement result of step 201 turns to "YES" indicating that the key event is occurred. Then, the processing proceeds to the next step 202 wherein all of new key-depression state signal KO, key data KD and key-touch data KT are written into the event buffer area 53a as key event data with respect to the key of which key-depression state is changed (see FIG. 3A).

Next, while executing processes of steps 203 and 210 to 212 so that a variable N is incremented by "1" from "0", processes of steps 204 to 209 are executed by each key event data until all of the data stored in the event buffer area 53a are run out.

During execution of the above-mentioned processes, the judgement result of step 204 turns to "YES" with respect to the key event data which concerns the key-depression event. In this case, if it is judged that "1" is set at the most significant bit (MSB) of the key event data EVTBUF(N) in the event buffer area 53a. Then, the processing proceeds to step 205 wherein the CPU 52 searches the non-used channel "c" for forming the musical tone signal. In addition, data "10+KD", "KT" concerning the data KO, KD, KT in the key event data EVTBUF(N) are respectively stored at storing positions KYB(c), KTB(c) corresponding to the searched channel "c". Herein, MSB of the data "10+KD" corresponds to the key-depression state signal KO (indicating the key-depression state). When the second bit of this data "10+KD" is at "1", it is indicated that the key-release state is decayed. When it is at "0", it is indicated that the key-release state is terminated. Such second bit is newly added by the process of step 205. After executing the process of step 205, the processing proceeds to step 206 wherein the searched channel data "c" and the key data KD which is stored at the storing position KYB(c) in the keyboard buffer area 53b are both transmitted to the musical tone signal forming circuit 40. In this circuit 40, the data distributing circuit 41 receives these data c, KD. Then, in synchronism with the channel timing designated by the channel data c, the data distributing circuit 41 outputs the key data KD to the phase information generating circuit 42 in the time-sharing manner. Thus, the pitch of the musical tone signal is to be controlled.

Thereafter, the processing proceeds to step 207 wherein all of segment data SEG(c,0), SEG(c,1) and time count data T(c,0), T(c,1) are initialized to "0". Herein, the segment data SEG(c,0), SEG(c,1) indicate the foregoing time-division segments by which the envelope waveform as shown in FIGS. 4A, 4B is divided in over a lapse of time. In addition, the time count data T(c,0), T(c,1) indicate periods of first segments (i.e., SEG(c,0), SEG(c,1)=0) of the envelope waveforms shown in FIGS. 4A, 4B respectively. In the envelope waveform shown in FIG. 4B, the period of first segment is zero.

Meanwhile, if the key event data concerns the key-release event, the judgement result of step 204 turns to "NO" indicating that MSB of the key event data EVTBUF(N) stored in the event buffer area 53a is at "0". In this case, the processing proceeds to step 208 wherein the CPU 52 searches the channel "c" to which the key data KD of the key event data is assigned. Then, upper two bits (i.e., leftmost two bits) of the storing position data KYB(c) corresponding to the searched channel c are set as "01", which indicates that the musical tone signal formed in the channel c concerns the key-release event and its tone volume is attenuated.

After executing the above-mentioned process of step 208, the processing proceeds to step 209 wherein both of the segment data SEG(c,0), SEG(c,1) designated by the channel c are set at "5". In addition, envelope data target values #EG(c,0), #EG(c,1) are respectively set equal to first off-levels OFL(m,0), OFL(m,1) corresponding to the tone color number m, while variation rate data K(c,0), K(c,1) are respectively set equal to first off-rates OFR(m,0), OFR(m,1) corresponding to the tone color number m. As a result, as shown in FIGS. 4A, 4B, the segment data SEG(c,0), SEG(c,1) are set for first segments of the envelope waveforms Just after the key-release event is occurred. In addition, the envelope data target values #EG(c,0), #EG(c,1) and variation rate data K(c,0), K(c,1) respectively indicate the target values and variation rates of the envelope data in the above-mentioned first segments of the envelope waveforms.

During execution of the processes concerning the key-operation event, when the timer circuit 54 outputs the timer interrupt signal, the CPU 52 executes the "timer interrupt program" shown in FIG. 8 to thereby sequentially form and output the envelope data EG(c,0), EG(c,1).

Execution of the timer interrupt program is started in step 400 shown in FIG. 8. In step 401, both of variables n, c are initialized to "0". Herein, the variable n indicates the kind of the envelope waveform (i.e., the envelope waveform shown in FIG. 4A or 4B), while the channel variable c indicates the channel in which the musical tone signal is to be formed. These variables n, c are used to form the envelope data EG(c,n) by each kind of envelope waveform and by each channel. In circulating processes of steps 402 to 419, the variable n is alternatively changed over between "0" and "1" by each channel variable c (which ranges from "0" to "7") by executing processes of steps 414, 415, 418. In addition, the channel variable c is varied in the range between "0" and "7".

in this case, the predetermined operations are commonly carried out with respect to each channel. Therefore, description will be only given with respect to the operation of forming the envelope data EG(c,n) concerning one channel.

First, description will be given with respect to the operation of forming the envelope data EG(c,0) in which the variable n is set at "0". After executing the initialization process of step 401, the processing proceeds to step 402 wherein in response to the channel variable c, the data stored at the storing position KYB(c) in the keyboard buffer area 53b is read out and then it is judged whether or not MSB of the read data is set at "1" indicating the key-depression state. Just after the time when the new key-depression is detected In response to the key-depression state signal from the external data input circuit 11, automatic performance data read-out circuit 12 and key switch circuit 13, MSB of the read data is set at "1" by the process of step 205 shown in FIG. 6. Thus, the judgement result of step 402 is "YES", so that the processing proceeds to step 403 wherein it is judged whether or not the touch flag TOUCH(O) is at "1". This touch flag TOUCH(O) is set in step 104 of the main program shown in FIG. 5 and such touch flag indicates whether or not to impart the effect due to the key-touch to the envelope waveform. When the touch flag TOUCH(O) is at "1", the judgement result of step 403 is "YES" so that the processing proceeds to step 404 wherein touch correction level data VL(0) (i.e., VL(n)) is set identical to the key-touch data KT stored at the storing position KTB(c) corresponding to the channel variable in the key-touch buffer area 53c. On the other hand, when the touch flag TOUCH(O) is at "0", the judgement result of step 403 is "NO", the processing proceeds to step 405 wherein the touch correction level data VL(0) is set at "0" in order that the data VL(0) is not affected by the key-touch.

Figure 9:
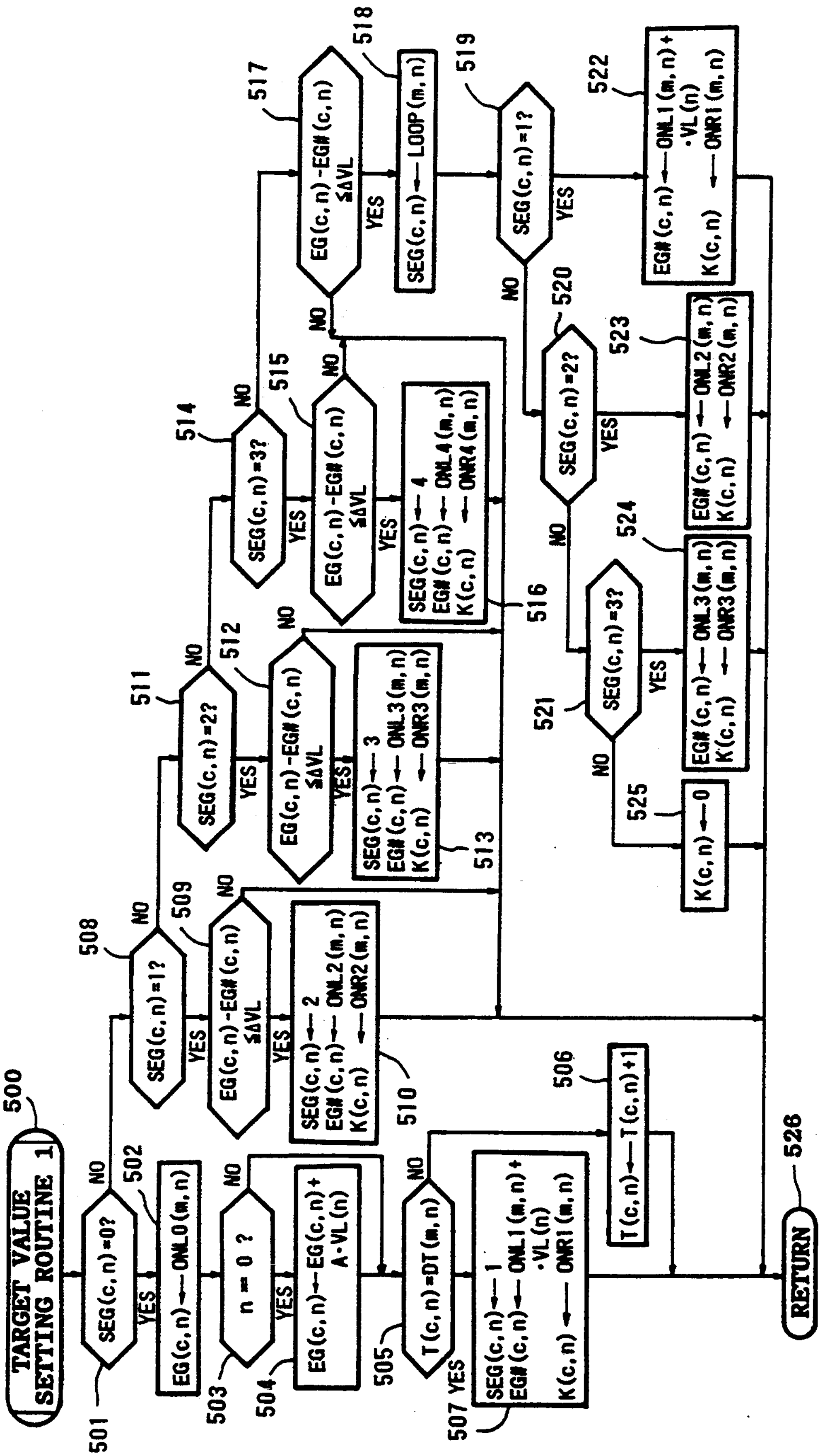
Figure 10:
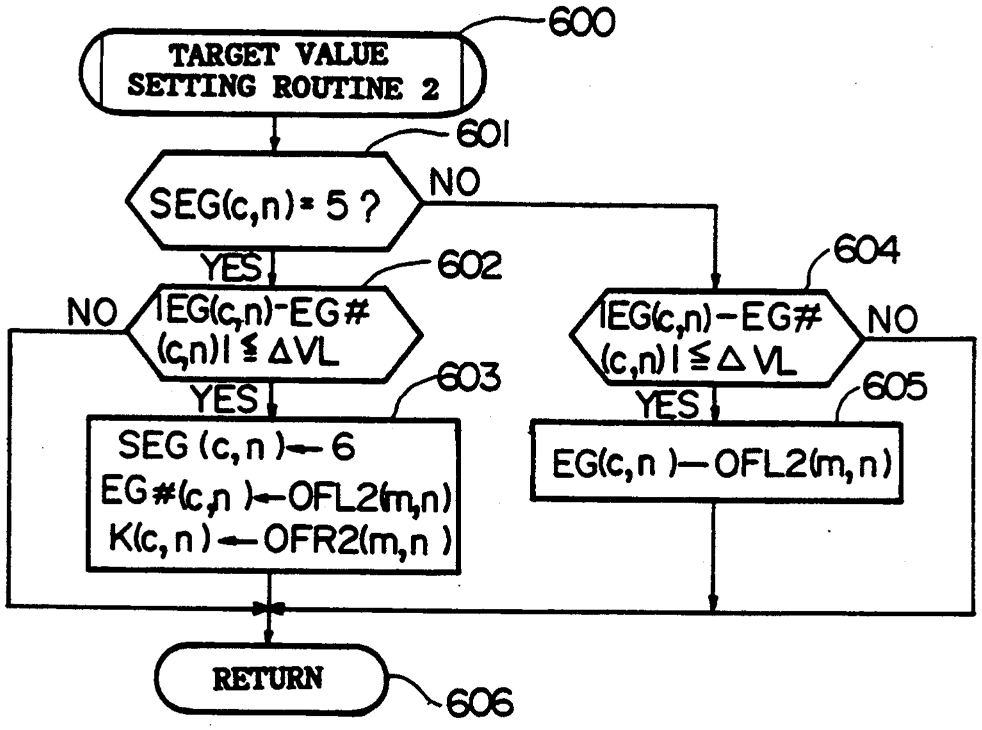

After executing the process of step 404 or 405, the processing proceeds to step 406 wherein "target value setting routine 1" is executed. This routine controls the operation of forming the envelope waveform during the key-depression. The detailed processes of this routine are shown in FIG. 9, and its execution is started in step 500.

In the case where the segment data SEG(c,0) is set at "0" by the process of step 207 shown in FIG. 6, the judgement result of step 501 turns to "YES", so that the processing proceeds to step 502 wherein the envelope data EG(c,0) is set identical to No. 0 on-level ONL(m,0) stored in the envelope level table area 53d. In this case, the variable n is set at "0", hence, the judgement result of step 503 turns to "YES". Then, the processing proceeds to step 504 wherein the envelope data EG(c,0) is renewed by data "EG(c,0)+A,VL(0)" of which EG(c,0) is set in step 502. Herein, "A" is the predetermined positive constant. Thus, if the touch correction level data VL(0) is at "0", the envelope data EG(c,0) represents the envelope waveform as shown by the solid line in FIG. 4A. If not, the envelope waveform corresponding to the envelope data EG(c,0) is changed to the waveform as shown by the dotted line in FIG. 4A.

In step 505, it is judged whether or not the time count data T(c,0) is equal to the delay time DT(m,0) stored in the envelope rate table area 53e. At first, the time count data T(c,0) is set at "0" by the process of step 207 shown in FIG. 6, hence, the judgement result of step 505 turns to "NO". Then, the processing proceeds to step 506 wherein "1" is added to the time count data T(c,0). Thereafter, execution of "target value setting routine 1" is terminated in step 526. In this case, the delay time DT(m,0) is not set at "0".

After executing the processes of "target value setting routine 1", the processing proceeds from step 406 to step 409 in the timer interrupt program shown in FIG. 8. In this case, the segment data SEG(c,0) is set at "0", and consequently the judgement result of step 409 is "YES". Then, the processing proceeds to step 413 wherein the variables c, n(=0) and envelope data EG(c,0) are sent to the musical tone signal forming circuit 40. In this circuit 40, the data distributing circuit 41 outputs the envelope data EG(c,0) to the multiplier 43 in synchronism with the channel timing corresponding to the variables c, n(=0). Thus, the multiplier 43 functions to control the amplitude of the modulation signal sinωt by the envelope data EG(c,0).

After controlling the amplitude of the modulation signal as described above, when a certain time has passed away, the timer interrupt program is executed again so that the foregoing processes of steps 501 to 506 (see "target value setting routine 1" shown in FIG. 9) are to be executed. In this case, since the envelope data EG(c,0) is maintained at the same value, the level of the envelope waveform is maintained at the constant level as shown in FIG. 4A. In contrast, the time count data T(c,0) is incremented by "1" every time the process of step 506 is executed.

By renewing the time count data T(c,0), when the renewed (or incremented) time count data T(c,0) becomes equal to the delay time DT(m,0), the judgement result of step 505 turns to "YES". Then, the processing proceeds to step 507 wherein the segment data SEG(c,0), envelope data target value EG#(c,0) and variation rate data D(c,0) are respectively set by the following formulae.

$$SEG(c,0)=1$$

$$EG\#(c,0)=ONL1(m,0)+B*VL(0)$$

$$K(c,0)=ONR1(m,0)$$

Incidentally, values of ONL1(m,0), ONR1(m,0) are equal to No. 1 on-level and No. 1 on-rate stored in the envelope level table area 53d and envelope rate table area 53e respectively. In addition, value B is the predetermined positive constant.

After executing the processes of "target value setting routine 1", the segment data SEG(c,0) is set at "1". Therefore, when the processing returns back to the timer interrupt program shown in FIG. 8, the judgement result of step 409 turns to "NO". In addition, the variable n is set at "0", hence, the judgement result of step 410 turns to "YES", so that the processing proceeds to step 411 wherein the envelope data EG(c,0) is renewed by the following formula.

$$EG(c,0)=EG(c,0)\pm K(c,0)$$

In the above formula, the operator "±" is changed to "+" so that the operation of "EG(c,0)+K(c,0)" is carried out when the relationship of "EG#(c,0)>EG(c,0)" is established between the envelope data target value EG#(c,0) and current envelope data EG(c,0). On the other hand, the operator "±" is changed to "−" so that the operation of "EG(c,0)−K(c,0)" is carried out when the relationship of "EG#(c,0)<EG(c,0)" is established.

Thereafter, when execution of the timer interrupt program is started again, the segment data SEG(c,0) is set at "1" so that the judgement result of step 501 is "NO" but the judgement result of step 508 is "YES". Then, the processing proceeds to step 509 wherein by carrying out the following formula, it is judged whether or not the envelope data EG(c,0) becomes approximately equal to the envelope data target value EG#(c,0).

$$|EG(c,0)-EG\#(c,0)|\leqq\Delta VL$$

Herein, value "ΔVL" is set at the predetermined small value. In this case, until the absolute value of the difference between two data EG(c,0), EG#(c,0) becomes lower than the predetermined value ΔVL, the judgement result of step 509 remains "NO" so that execution of "target value setting routine 1" is terminated in step 526. Hence, every time the timer interrupt program is executed, the envelope data EG(c,0) is renewed in step 411 shown in FIG. 8. Thus, as shown in "segment 1" in FIG. 4A, No. 1 on-rate ONR1(m,0) is increased linearly toward No. 1 on-level ONL1(m,0).

In this state, when the envelope data EG(c,0) becomes close to the envelope data target value EG#(c,0) so that the relationship of "|EG(c,0)−EG#(c,0)|≦ΔVL" is established between two data EG(c,0), EG#(c,0), the judgement result of step 509 turns to "YES" so that the processing proceeds to step 510 wherein the segment data SEG(c,0), envelope data target value EG#(c,0) and variation rate data K(c,0) are set by the following formulae.

$$SEG(c,0)=2$$

$$EG\#(c,0)=ONL2(m,0)$$

$$K(c,0)=ONR2(m,0)$$

Herein, the values ONL2(m,0), ONR2(m,0) represent No. 2 on-level, No. 2 on-rate stored in the envelope level table area 53d and envelope rate table area 53e respectively.

Due to the processes of steps 511,512 (see FIG. 9) and step 411 (see FIG. 8) to be executed in the state where the segment data SEG(c,0) is set at "2" as described above, the envelope data EG(c,0) is varied linearly toward No. 2 on-level ONL2(m,0) by No. 2 on-rate ONR2(m,0) as shown in "segment 2" in FIG. 4A. When the envelope data EG(c,0) becomes approximately equal to No. 2 on-level ONL2(m,0), the judgement result of step 512 turns to "YES" Indicating that the relationship of "|EG(c,0)−EG#(c,0)|≦ΔVL" is established. Then, the processing proceeds to step 513 wherein the segment data SEG(c,0), envelope data target value EG#(c,0) and variation rate data K(c,0) are set by the following formulae.

$$SEG(c,0)=3$$

$$EG\#(c,0)=ONL3(m,0)$$

$$K(c,0)=ONR3(m,0)$$

Herein, values ONL3(m,0), ONR3(m,0) represent No. 3 on-level, No. 3 on-rate stored In the envelope level table area 53d and envelope rate table area 53e respectively.

As described above, the segment data SEG(c,0) is varied to as "3", "4" so that the envelope waveform of "segment 3" and "segment 4" is to be formed in FIG. 4A. Incidentally, when completely forming the the envelope waveform of "segment 3", the judgement result of step 515 is "YES" so that the processing proceeds to step 516 wherein based on No. 4 on-level ONL4(m,0) and No. 4 on-rate ONR4(m,0) stored in the envelope level table area 53d and envelope rate table area 53e respectively, the segment data SEG(c,0), envelope data target value EG#(c,0) and variation rate data K(c,0) are set by the following formulae.

$$SEG(c,0)=4$$

$$EG\#(c,0)=ONL4(m,0)$$

$$K(c,0)=ONR4(m,0)$$

Further, when completely forming the envelope waveform of "segment 4", the judgement result of step 517 turns to "YES" so that the processing proceeds to step 518 wherein the segment data SEG(c,0) is set equal to the loop number LOOP(m,0) stored in the envelope level table area 53d. Incidentally, the loop number LOOP(m,0) is set in the "parameter setting routine" shown in FIG. 7. In the present embodiment, this loop number is set at any one of the limited values "1" to "4".

After executing the process of step 518, its succeeding processes of steps 519 to 521 judge the current value of the segment data SEG(c,0). In this case, when the segment data SEG(c,0) is set at "1", the judgement result of step 519 turns to "YES" so that the processing proceeds to step 522 wherein as similar to the foregoing process of step 507, the envelope data target value EG#(c,0) and variation rate data K(c,0) are set by the following formulae.

$$EG\#(c,0)=ONL1(m,0)+B*VL(0)$$

$$K(c,0)=ONR1(m,0)$$

Thus, the process of forming the envelope data EG(c,0) is returned back to the state where the process of step 507 is carried out. Therefore, the process of forming the envelope waveform of "segment 1" to "segment 4" is to be successively carried out.

When the segment data SEG(c,0) is set at "2" by the process of step 518, the judgement result of step 520 turns to "YES" so that the processing proceeds to step 523 wherein as similar to the foregoing process of step 510, the envelope data target value EG#(c,0) and variation rate data K(c,0) are set by the following formulae.

$$EG\#(c,0)=ONL2(m,0)$$

$$K(c,0)=ONR2(m,0)$$

Thus, the process of forming the envelope data EG(c,0) is returned back to the state where the foregoing process of step 510 is carried out. Therefore, the process of forming the envelope waveform of "segment 2" to "segment 4" is to be successively carried out.

When the segment data SEG(c,0) is set at "3" by the foregoing process of step 518, the judgement result of step 521 turns to "YES" so that the processing proceeds to step 524 wherein as similar to the foregoing process of step 513, the envelope data target value EG#(c,0) and variation rate data K(c,0) is set by the following formulae.

$$EG\#(c,0)=ONL3(m,0)$$

$$K(c,0)=ONR3(m,0)$$

Thus, the process of forming the envelope data EG(c,0) is returned back to the state where the foregoing process of step 513 is carried out. Therefore, the process of forming the envelope waveform of "segment 3" and "segment 4" is to be successively carried out.

Further, when the segment data SEG(c,0) is set at "4" by the foregoing process of step 518, all of the judgement results of steps 519, 520,521 are "NO" so that the processing proceeds to step 525 wherein the variation rate data K(c,0) is set at "0". Thereafter, execution of "target value setting routine 1" is terminated in step 526. Thus, even if the variation rate data K(c,0) is added to the envelope data EG(c,0) in step 411 shown in FIG. 8, the envelope data EG(c,0) is not changed so that No. 4 on-level ONL4(m,0) is maintained as it is.

As described heretofore, the envelope waveform is repeatedly formed with respect to each segment. As a result, as long as the key-depression state goes on, the polygonal envelope waveform of "segment 1" to "segment 3" is continuously formed or the smooth envelope waveform which is maintained at No. 4 on-level ONL4(m,0) is continuously formed as shown in FIG. 4A.

In this state, when the key-depression state signal from the external data input circuit 11, automatic performance data read-out circuit 12 and key switch circuit 13 represents the key-releases state, the upper two bits of the data stored at the storing position KYB(c) corresponding to the searched channel c in the keyboard buffer area 53b is changed to "01" by the process of step 208 shown in FIG. 6. Thus, in the timer interrupt program shown In FIG. 8, the judgement result of step 402 turns to "NO" but the judgement result of step 407 turns to "YES" so that the processes of "target value setting routine 2" are to be executed. In this case, the segment data SEG(c,0) is set at "5" by the process of step 209 shown In FIG. 6, while the envelope data target value EG#(c,0) and variation rate data K(c,0) are respectively set equal to No. 1 off-level OFL(m,0) and No. 1 off-rate OFR(m,0).

Thus, as similar to the foregoing case of the key-depression state, the envelope data EG(c,0) is linearly varied toward No. 1 off-level OFL1(m,0) by No. 1 off-rate OFR1(m,0) as shown in "segment 5" in FIG. 4A by the processes of steps 601, 602 (see FIG. 10) and step 411 (see FIG. 8). When the envelope data EG(c,0) becomes equal to No. 1 off-level OFR1(m,0), the judgement result of step 602 turns to "YES" Indicating the relationship of "|EG(c,0)−EG#(C,0)|≦ΔVL". Then, the processing proceeds to step 603 wherein the segment data SEG(c,0), envelope data target value EG#(c,0) and variation rate data K(c,0) are set by the following formulae.

$$SEG(c,0)=6$$

$$EG\#(c,0)=OFL2(m,0)$$

$$K(c,0)=OFR2(m, 0)$$

Herein, values OFL2(m,0), OFR2(m,0) represent No. 2 off-level and No. 2 off-rate stored in the envelope level table area 53d and envelope rate table area 53e.

By the foregoing processes of steps 601, 604 (see FIG. 10) and step 411 (see FIG. 8) which are carried out under the state where the segment data SEG(c,0) is set at "6", the envelope data EG(c,0) is linearly varied toward No. 2 off-level OFL2(m,0) by No. 2 off-rate OFR2(m,0) as shown In "segment 6" in FIG. 4A. When the envelope data EG(c,0) becomes equal to No. 2 off-level OFL2(m,0), the judgement result of step 604 turns to "YES" indicating that the relationship of "|EG(c,0)−EG#(c,0)|≦ΔVL" is established. Then, the processing proceeds to step 605 wherein the envelope data EG(c,0) is set at No. 2 off-level OFL2(m,0). The object of this process of step 605 is to accurately coincide the envelope data EG(c,0) with No. 2 off-level OFL2(m,0) when generation of the musical tone is completed.

As described heretofore, the present embodiment forms the envelope data EG(c,0) which varies over a lapse of time. Such envelope data EG(c,0) is supplied to the musical tone signal generating circuit 40 by the process of step 413 shown in FIG. 8, so that it will control the amplitude of the modulation signal. Thus, as shown by the envelope waveform in FIG. 4A, the amplitude of the modulation signal is attenuated.

In the above description concerning the operation of forming the envelope waveform, the delay time DT(m,0) is not set at "0" for convenience sake. However, when the delay time DT(m,0) is set at "0", the envelope waveform of "segment 0" is not formed substantially. Therefore, the other envelope waveform of "segment 1" to "segment 6" is to be formed. In this case, Just after the time count data T(c,0) is set at "0" by the process of step 207 (see FIG. 6) when the new key-depression event is occurred, the judgement result of step 505 (see FIG. 9) in "target value setting routine 1" within the timer interrupt program turns to "YES" so that the processing proceeds to step 507 wherein the segment data SEG(c,0) is set at "1".

Next, description will be given with respect to the operation of forming the envelope data EG(c,1) in the case where the variable n is set at "1". In this case, when the new key-depression is detected during the execution of the key-operation detecting routine shown in FIG. 6, the segment data SEG(c,1) and time count data T(c,1) are both initialized in step 207. Then, the CPU 52 executes the timer interrupt program (see FIG. 8) including the processes of "target value setting routine 1" (see FIG. 9). Herein, the envelope data EG(c,1) is computed with respect to "segment 1" to "segment 4", so that the present embodiment will form the envelope waveform which varies in a lapse of time in the period between the key-depression detecting timing and key-release detecting timing. Thereafter, when the key-release state is detected by executing the key-operation detecting routine (see FIG. 6), the segment data SEG(c,1), envelope data target value EG#(c,1) and variation rate data K(c,1) are renewed by the process of step 209. After that, by executing the timer interrupt program including the processes of "target value setting routine 2", the envelope data EG(c,1) is computed with respect to "segment 5" and "segment 6". Thus, the present embodiment will form the envelope waveform which varies over a lapse of time during the period between the key-release detecting timing and the timing when generation of the musical tone is completed.

FIG. 4B shows the envelope waveform which is formed in accordance with the envelope data EG(c,1) as described above. In this envelope waveform shown in FIG. 4B, the delay time DT(m,1) is set at "0", so that this envelope waveform varies with respect to "segment 1" to "segment 6". In this case, by setting the delay time DT(m,1) at the value other than "0", it is possible to insert the envelope waveform portion corresponding to "segment 0" into the envelope waveform shown in FIG. 4B.

Since the variable n is set at "1" when forming the envelope data EG(c,1), the judgement result of step 410 (see FIG. 8) turns to "NO", so that the processing proceeds to step 412 wherein the envelope data EG(c,1) is renewed by the following formula.

$$EG(c,1)=EG(c,1)+K(c,1)*[EG\#(c,1)-EG(c,1)]$$

Thus, as shown in FIG. 4B, the envelope waveform curve of each segment is varied not linearly but exponentially (or logarithmically). In addition, the judgement result of step 503 (see FIG. 9) also turns to "NO" so that the CPU 52 omits the addition process of step 504 wherein the touch correction level data VL(1) is added to the envelope data EG(c,1). Therefore, the envelope waveform level of "segment 0" and initial level of "segment 1" should be maintained at No. 0 on-level ONL0(m,1).

When forming the envelope waveform shown in FIG. 4B, the envelope data EG(c,1) is set at No. 2 off-level OFL2(m,1) (which is normally at "0") by the process of step 605 (see FIG. 10) after completely forming the envelope waveform of "segment 6" when generation of the musical tone is completed. At this time, the judgement result of step 416 within the timer Interrupt program (see FIG. 8) turns to "YES", indicating that the second bit of the data stored at the storing position KYB(c) in the keyboard buffer area 53b is set at "1" (i.e., the musical tone is attenuated after the key-release event) and envelope data EG(c,1) is set at No. 2 off-level OFL2(m,1). Then, the CPU 52 clears the data stored at the storing positions KYB(c), KTB(c) in the keyboard buffer area 53b and key-touch buffer area 53c respectively by the process of step 417. As a result, both of the judgement results of steps 402, 407 (see FIG. 8) turn to "NO". Hence, the CPU 52 executes the processes of steps 403 to 406, 408 to 413 wherein the envelope data EG(c,0), EG(c,1) are renewed and then outputted. In addition, it becomes possible to use the non-used channel of forming the musical tone which is designated by the channel variable c.

The envelope data EG(c,1) which is formed as described above is outputted to the musical tone signal forming circuit 40 by the process of step 413 shown in FIG. 8. In this case, the variable n to be outputted with the envelope data EG(c,1) is set at "1". Thus, in the musical tone signal forming circuit 40, the envelope data EG(c,1) is supplied to the multiplier 44 in synchronism with the channel timing represented by the channel variable c. Hence, the envelope amplitude of the musical tone signal to be outputted is controlled in accordance with the envelope waveform which is formed by the envelope data EG(c,1).

Under the above-mentioned amplitude control, the musical tone signal forming circuit 40 outputs the musical tone signal TS to the D/A converter 48, wherein the musical tone signal TS can be represented by the following formula.

$$TS=EG(c,1)*sin(\omega t+EG(c,0)*sin\omega t)$$

The D/A converter 48 converts the digital musical tone signal TS into the analog musical tone signal, which is outputted to the sound system 49. Thus, the sound system 49 generates the musical tone corresponding to the musical tone signal TS.

As described heretofore, according to the present embodiment, it is possible to repeatedly form the envelope waveform of the desirable segment within "segment 1" to "segment 4" by use of the envelope data EG(c,0), EG(c,1). In addition, it is possible to impart the desirable variation characteristic to the envelope waveform of each segment. Therefore, even if the key-depression period becomes long, it is possible to generate the musical tone full of variety. Further, when repeatedly forming the envelope waveform, it is possible to use each parameter in overlapping manner. Therefore, it is possible to reduce the storage capacity of the memory storing the parameters. Furthermore, it is possible to arbitrarily set the delay time DT and the initial level of the envelope waveform of "segment 0". Thus, particularly, it is possible to effect the delicate control on the characteristic of the musical tone at its leading edge timing. For this reason, it is possible to increase the freedom of degree when making the sounds.

C. Modified Examples

Incidentally, it is possible to modify the present embodiment as follows.

(1) In the present embodiment described above, the envelope data EG(c,0) representative of the envelope waveform for the modulation signal is varied linearly in each segment, while another envelope data EG(c,1) representative of the envelope waveform for the musical tone signal is varied exponentially (or logarithmically) in each segment. However, it is possible to vary the envelope data EG(c,0) exponentially (or logarithmically) and vary the envelope data EG(c,1) linearly. In addition, it is possible to vary both of the envelope data EG(c,0), EG(c,1) linearly or exponentially (or logarithmically). Such modification can be made by changing the judgement condition of the process of step 410 which selects one of the processes 411,412 (see FIG. 8).

In addition, it is possible to modify the present embodiment such that a desired one of the variation characteristics can be selected for each envelope waveform. In this case, the performer can select one of the linear variation characteristic and exponential variation characteristic in the parameter setting process shown in FIG. 5 (i.e., parameter setting routine shown in FIG. 7), while the judgement condition of the process of step 410 is changed such that one of the processes of steps 411,412 is selected in accordance with the characteristic selection made by the performer.

(2) In the present embodiment, when repeatedly forming the envelope data EG(c,0), EG(c,1), the repeat start timing is set as the loop data LOOP(m,n) so that the envelope waveform from the repeat start timing to "segment 4" is repeatedly formed. However, it is possible to also set the repeat end timing as the loop data. In this case, the envelope waveform from the repeat start timing to the repeat end timing is repeatedly formed.

The present embodiment provides "segment 0" to "segment 4" for the key-depression state and also provides "segment 5" and "segment 6" for the key-release state. However, it is possible to further divide such segment so that larger number of the segments can be applied for the key-depression and key-release states respectively.

(3) The present embodiment employs the FM operation as the musical tone synthesizing method in the musical tone signal forming circuit 40. However, as disclosed in Japanese Patent Publication No. 63-42276, it is possible to employ the musical tone signal forming circuit which performs more complicated FM operation to synthesize the musical tone. In this case, the envelope waveform generating unit according to the present embodiment can be also utilized. Herein, as shown in the dotted line in FIG. 2, the control signal based on the operation of the tone color selecting switches 25 can be supplied to the musical tone signal forming circuit 40 so that the FM operation manner is to be controlled. Then, it is possible to form a larger number of kinds of the envelope waveforms, each of which is used for each FM operation.

Further, it is possible to use the present envelope waveform generating unit for the waveform-memory-type or higher-harmonic-wave-type musical tone synthesizing method. In case of the waveform-memory-type musical tone synthesizing method, plural waveform signals are read out In parallel or in time-sharing manner, then the different envelope waveforms are imparted to each of the read waveform signals, and thereafter the waveform signals are mixed together. In case of the higher-harmonic-wave-type musical tone synthesizing method, plural envelope waveforms can be used as the envelope waveform corresponding to each overtone.

(4) In the present embodiment, several kinds of the parameters are set in the envelope level table area 53d and envelope rate table area 53e in response to the operation of the parameter setting switches 25. In addition, it is possible to input several kinds of the parameters via the external connection terminal 14 and external data input circuit 11 and then supply them to these tables 53d, 53e. Thus, is is possible to use several kinds of the parameters which are generated in the external device such as the other electronic musical instruments and the parameter setting unit configured by the computer for only setting the parameters, and then use them in the operation of forming the musical tone signal.

As described heretofore, this invention may be practiced or embodied in still other ways without departing from the spirit or essential character thereof. Therefore, the preferred embodiment described herein is illustrative and not restrictive, the scope of the invention being indicated by the appended claims and all variations which come within the meaning of the claims are intended to be embraced therein.

What is claimed is:

1. A musical tone control waveform signal generating apparatus comprising:

parameter storing means for storing parameters which are used to compute a musical tone control waveform signal with respect to each of plural time-division intervals;

computation means for carrying out computations based on said parameters;

musical tone control waveform signal forming means for forming said musical tone control waveform signal based on computations with respect to each of said plural time-division intervals through operation of said computations means using said parameters sequentially read from said parameter storing means; and control means for controlling said computation means to repeat and sequentially read particular parameters from said storage means such that said musical tone control waveform signal forming means repeatedly reproduces particular portions of said musical tone control waveform signal, wherein said repeatedly reproduced particular portions are formed by a plurality of adjacent predetermined intervals representing a subgroup of said plural time-division intervals, and wherein said musical tone control waveform signal in said adjacent predetermined intervals is repeatedly computed based on said parameters corresponding to each of said adjacent plural predetermined intervals.

2. A musical tone control waveform signal generating apparatus according to claim 1, further including input means for inputting said parameters into said parameter storing means.

3. A musical tone control waveform signal generating apparatus according to claim 1, wherein said control means further comprises:

storing means for storing repeat-section data indicating said plural predetermined intervals; and means for controlling said musical tone control waveform signal forming means such that said musical tone control waveform signal of said plural predetermined intervals are repeatedly formed.

4. A musical tone control waveform signal generating apparatus according to claim 3, further including input means for inputting said repeat-section data into said storing means.

5. A musical tone control waveform signal generating apparatus comprising:

parameter storing means for storing parameters which define a musical tone control waveform signal;

computation means for carrying out a computation based on said parameters;

musical tone control waveform signal forming means for forming a musical tone control waveform signal under operation of said computation means by use of said parameters, wherein an envelope level of said musical tone control waveform signal is varied in a lapse of time;

initial level setting means for setting an initial level of said musical tone control waveform signal at a predetermined level independent of the other parameters;

initial period setting means for setting an initial period in which said musical tone control waveform signal is at said predetermined level set by said initial level setting means; and control means for controlling said musical tone control waveform signal forming means such that said musical tone control waveform signal is maintained at said predetermined level during said initial period set by said initial period setting means.

6. A musical tone control waveform signal generating apparatus according to claim 1, wherein said parameters include a variation rate and a target level of said musical tone control waveform signal.

7. A musical tone control waveform signal generating apparatus comprising:

a parameter storage device for storing parameters which are used to compute a musical tone control waveform signal over a plurality of time-division intervals;

a central processing unit for carrying out computations based on the parameters;

a musical tone control waveform signal forming circuit for forming the musical tone control waveform signal based on computations carried out through operation of the central processing unit using the parameters sequentially read from the parameter storage device; and a control circuit for controlling the musical tone control waveform signal forming circuit such that at least two adjacent portions of the musical tone control waveform signal respectively produced over at least two corresponding adjacent time divisional intervals differ from each other and are adjacently repeated over at least two additional time divisional intervals.

8. A musical tone control waveform signal generating apparatus according to claim 7, further including an input device for inputting the parameters into the parameter storage device.

9. A musical tone control waveform signal generating apparatus according to claim 7, wherein the control circuit further includes:

storing means for storing repeat-section data indicating the at least two adjacent portions of the musical tone control waveform signal; and means for controlling the musical tone control waveform signal forming circuit such that the musical tone control waveform signal of the at least two adjacent portions are repeatedly formed.

10. A musical tone control waveform signal generating apparatus according to claim 9, further including an input device for inputting the repeat-section data into the storing means.

11. A musical tone control waveform signal generating apparatus according to claim 7, wherein the parameters include a variation rate and a target level of the musical tone control waveform signal.

* * * * *